United States Patent [19]
Masuda et al.

[11] Patent Number: 5,518,792
[45] Date of Patent: May 21, 1996

[54] PACKAGING MATERIALS HAVING OXYGEN BARRIER QUALITY

[75] Inventors: Naoki Masuda; Norimasa Sekine; Takeo Tomatsuri; Keiko Nakamura; Mamoru Sekiguchi, all of Tokyo, Japan

[73] Assignee: Toppan Printing Co., Ltd., Tokyo, Japan

[21] Appl. No.: 294,026

[22] Filed: Aug. 24, 1994

[30] Foreign Application Priority Data

| Aug. 25, 1993 | [JP] | Japan | ................................. 5-210251 |
| Oct. 6, 1993 | [JP] | Japan | ................................. 5-250355 |
| May 25, 1994 | [JP] | Japan | ................................. 6-111055 |

[51] Int. Cl.$^6$ .................................................. B29D 22/00
[52] U.S. Cl. .................... 428/36.6; 428/35.8; 428/35.9; 428/412; 428/458; 428/461; 428/500; 428/688
[58] Field of Search ..................... 428/412, 500, 428/458, 461, 463, 688, 35.8, 35.9, 36.6, 514

[56] References Cited

U.S. PATENT DOCUMENTS

| 5,164,438 | 11/1992 | Umeyama et al. | ........................ 525/61 |
| 5,302,430 | 4/1995 | Ardechir et al. | ........................ 428/35.7 |
| 5,405,880 | 4/1995 | Kimura et al. | ............................ 523/126 |

*Primary Examiner*—Edith Buffalow
*Attorney, Agent, or Firm*—Armstrong, Westerman, Hattori, McLeland & Naughton

[57] ABSTRACT

The improved packaging material having oxygen barrier quality has a thin layer of inorganic substance formed on a layer of resin composition having oxygen barrier quality that comprises at least a thermoplastic resin and an oxidation catalyst. The packaging material is inexpensive, can be processed efficiently and it yet develops high oxygen barrier quality right after processing and maintains it for a prolonged period of time.

5 Claims, 1 Drawing Sheet

PACKAGING MATERIALS HAVING OXYGEN BARRIER QUALITY

BACKGROUND OF THE INVENTION

This invention relates to packaging materials having oxygen barrier quality.

Packaging materials in current use are mostly made of polymers that can be easily processed into various shapes such as films, sheets, bottles and vessels and which are also lightweight to permit transportation at low cost.

When the materials to be packed are food and other substances that are prone to deteriorate by oxidation, packaging materials are required to have particularly high oxygen barrier quality. To meet this need, polymers of high oxygen barrier quality such as the saponification product of an ethylene-vinyl acetate copolymer (EVOH) and polyvinylidene chloride, as well as films with evaporated coatings of aluminum or silicon oxides have been used. However, the polymers having high oxygen barrier quality have been too expensive to be commercialized. In addition, EVOH has the problem that its oxygen barrier quality decreases upon moisture absorption. The films with evaporated coats suffer the disadvantage that pinholes or cracks will prevent them from exhibiting the intended oxygen barrier quality in a consistent manner.

The present inventors previously filed a Japanese patent application (now published as Unexamined Published Japanese Patent Application Hei 4-213346) and proposed a polyolefinic resin composition that dispensed with costly resins having oxygen barrier quality by using a polyolefin and an oxidation catalyst and which yet would exhibit satisfactory oxygen barrier quality over time. However, this polyolefinic resin composition which is intended to exhibit oxygen barrier quality over time has had the problem that if it is rendered as a film with a thickness of 100 μm and less, the intended oxygen barrier quality is not fully exhibited right after processing into the film.

SUMMARY OF THE INVENTION

The present invention has been accomplished under these circumstances and has as an object providing a packaging material that is inexpensive, that can be processed efficiently and which yet develops high oxygen barrier quality right after processing and maintains it for a prolonged period of time.

This object can be attained by a packaging material having oxygen barrier quality that has a thin layer of inorganic substance formed on a layer of resin composition having oxygen barrier quality that comprises at least a thermoplastic resin and an oxidation catalyst.

DETAILED DESCRIPTION OF THE INVENTION

The present invention is described below in detail. The packaging material of this invention which has oxygen barrier quality can have the layer of thermoplastic resin formed on either one or both sides thereof and it is overlaid with various kinds of films so that it is usable as a film, sheet or the like.

The oxidation catalyst to be used in the present invention is preferably selected from among metal catalysts that comprise compounds of transition metals and the like. Transition metals would catalyze the reaction of oxygen with polyolefins in the process of transition of metal ions from an oxidized state to a reduced state or vice versa.

Preferred transition metals include Co, Mn, Fe, Cu, Ni, Ti, V and Cr. Compounds of these metals may be salts with organic acids. Exemplary salt forming acids include stearic acid, naphthenic acid, linoleic acid, dimethyldithiocarbamic acid, oleic acid, formic acid, gluconic acid, oxalic acid and fumaric acid. Also preferred are organic metal complex salts having ligands such as porphyrin, phthalocycniane, quinoline, ethylenediamine, pyridine, propylenediamine, diethylenetriamine, triethylenetetramine, 2,2'-biperidine, 1,10-phenanthrone, ethylenediamine tetracetate, dimethylglyoximate, glycinate, acetylacetonate and Schiff base. Other metal compounds that can be used include inorganic salts such as iron chloride, ammonium chloride and Cobalt Blue. The metal compounds listed above may be used either alone or in admixtures.

For the principal reason of hygiene, aluminum compounds and food additives such as sodium salt of ferrcus citrate, ferric citrate, ammonium salt of iron citrate, zinc gluconate, ferrous gluconate, copper gluconate, iron lactate, ferrous pyrophosphate, ferric pyrophosphate, sodium nitrate and ferrous sulfate may also be used with advantage.

The oxidation catalyst mentioned above may be contained in amounts of 10–1000 ppm, preferably 50–500 ppm, in terms of the atomic concentration of metals in the thermoplastic resin.

The thermoplastic resin that can be used in the present invention may be exemplified by polyolefins, EVOH, etc.; thermoplastic resins may be used either alone or as blends.

Polyolefins to be used in the present invention may be exemplified by homopolymers such as high-density polyethylene, low-density polyethylene, linear low-density polyethylene, polypropylene, polybutene and polymethylpentene, as well as copolymers of two or more monomers selected from among olefins such as ethylene, propylene, butene and methylpentene.

The polyolefins to be used in the invention are generally susceptible to oxidation and commonly used in combination with radical inhibitors. However, the polyolefins containing oxidation catalysts according to the invention are either free of radical inhibitors or may contain up to 500 ppm of radical inhibitors. Radical inhibitors added in such small amounts are incapable of total prevention of the progress of oxidation in the polyolefins and oxygen takeup will occur without compromising the advantages of the invention. On the contrary, the oxygen barrier quality of the packaging material of the invention may be controlled by adjusting the addition of radical inhibitors.

For assuring effective oxygen barrier quality, the EVOH to be used in the present invention has preferably an ethylene content of 22–48 mol %, with the degree of saponification being 99–100 mol %.

If thermoplastic resins are to be blended for use in the invention, exemplary thermoplastic resins are polyolefins including homopolymers such as high-density polyethylene, low-density polyethylene, linear low-density polyethylene, polypropylene, polybutene and polymethylpentene, as well as copolymers of monomers selected from among olefins such as ethylene, propylene, butene and methylpentene. Alternatively, EVOH, polyvinylidene chloride, polyvinyl chloride, polyesters, polycarbonates, polymethyl methacrylate, polyacrylonitrile, polystyrenes, polyurethanes, polyamides, polyvinyl acetate, polyvinyl alcohol and polyoxymethylene may be used. If desired, copolymers of two or more monomers selected from among components in the polymers listed above and common olefins, or modified resins of such copolymers may also be used. Two or more thermoplastic resins selected from this list may be blended together.

When blending thermoplastic resins, the resin composition of the invention having oxygen barrier quality can be formed from a thermoplastic resin by dispersing at least one other thermoplastic resin and an oxidation catalyst in the first-mentioned thermoplastic resin. There is no particular limitation on the manner in which one thermoplastic resin is combined with the other thermoplastic resin. Hence, one thermoplastic resin may be present in islands without exhibiting complete compatibility with the other thermoplastic resin. Even in this way, the dispersed thermoplastic resin will effectively react with the oxidation catalyst to trap oxygen, thereby assuring better oxygen barrier quality.

When blending thermoplastic resins, the resin composition of the invention which has oxygen barrier quality may conveniently be produced by simultaneously mixing two or more thermoplastic resins with the oxidation catalyst and then processing the mixture. Alternatively, one thermoplastic resin may be melt blended with the oxidation catalyst and the resulting blend is when dispersed in the other thermoplastic resin, with the dispersion being subsequently processed. The latter method has the particular advantage that the preliminary melt blending of the oxidation catalyst and one thermoplastic resin allows the former to be dispersed more efficiently in the thermoplastic resin to be oxidized.

The thermoplastic resins to be used in the invention may contain various additives such as compatibilizers, lubricants, antiblocking agents, antifoggants and colorants. Exemplary compatibilizers include polyolefins modified by grafting maleic anhydride.

The thin layer of inorganic substance to be formed in the present invention uses preferably metals such as Al, Mg, Ca, Sn, Ti, Zn and Zr, oxides thereof, or oxides of non-metallic inorganic substances. The thin layer of such inorganic substances can be formed by any known techniques such as vacuum evaporation, plasma evaporation, ion plating and sputtering. The thin layer of inorganic substances suffices to have a thickness of 200–1500 Å.

The layer of the resin composition of the invention having oxygen barrier quality which comprises at least the thermoplastic resin and oxidation catalyst described above is capable of heat sealing on its own and, hence, is used advantageously as a packaging material.

Speaking of EVOH, its oxygen barrier quality will drop in a hot and humid condition, particularly when it is exposed to hostile conditions as in the case of retorting food packages. If such retorting is expected, the thin layer of inorganic substances has preferably a thickness of 1000–2000 Å to retain the necessary oxygen barrier quality. The layer of the resin composition comprising the EVOH and oxidation catalyst is not capable of very effective heat sealing to other layers on its own, so if it is to be processed into films for use as packaging bags, one side of it is advantageously laminated with a heat sealing layer.

To impart practical functions to the packaging material of the invention which has oxygen barrier quality, it may be laminated with another thermoplastic resin layer. For instance, to protect the thin layer of inorganic substance against deterioration due to external and physical factors, it may be laminated with a thermoplastic resin layer. For other purposes such as improving the strength of the final package, the layer of the resin composition having oxygen barrier quality which contains the oxidation catalyst may be laminated with a thermoplastic resin layer. In this case, either of the following well known processing methods may be applied: 1) a laminate is first formed of the layer of the resin composition having oxygen barrier quality which contains the oxidation catalyst and a thermoplastic resin layer and the laminate in turn is overlaid with the thin layer of inorganic substance; ii) the layer of the resin composition having oxygen barrier quality which contains the oxidation catalyst is first overlaid with the thin layer of inorganic substance, which in turn is overlaid with a reinforcing thermoplastic resin layer.

The mechanism by which the layer of the resin composition having oxygen barrier quality which contains the oxidation catalyst exhibits oxygen barrier quality is that the thermoplastic resin is oxidized by the oxidation catalyzing action, thereby trapping oxygen in that layer. Stated more specifically, the thermoplastic resin to be used in the invention is prone to form radicals during processing or storage under the action of light or heat in the presence of the oxidation catalyst; the resulting polymer radicals will react with the dissolved oxygen in the resin to form peroxy radicals; the peroxy radicals will in turn abstract the hydrogen in the polymer chain to form a hydroperoxide and polymer radicals; the hydroperoxide is decomposed into alkoxy radicals and hydroxy radicals, reacting further with the polymer chain in the thermoplastic resin to generate radicals. This sequence of oxidation radical reactions enables oxygen trapping by the layer of the resin composition having oxygen barrier quality.

While this sequence of oxidation radical reactions would start immediately in the presence of oxygen upon processing to shape the layer of resin composition having oxygen barrier quality which contains the oxidation catalyst, the ability of the resin layer to trap oxygen thereby exhibiting oxygen barrier quality is not satisfactory at the initial stage of reactions. To deal with this problem, the thin layer of inorganic substance as used in the invention serves to exhibit the intended oxygen barrier quality as soon as the packaging material of the invention which has oxygen barrier quality is produced.

The thin layer of inorganic substance as used in the invention suppresses the passage of oxygen through the layer of resin composition having oxygen barrier quality which contains the oxidation catalyst. Stated more specifically, any oxygen that will strain itself to pass through pinholes or other defects in the thin layer of inorganic substance is trapped within said layer of resin composition having oxygen barrier quality which contains the oxidation catalyst, whereby high oxygen barrier quality will be developed for an extended period of time.

Several embodiments of the invention as it release to a packaging material having oxygen barrier quality or a laminated packaging material having oxygen barrier quality are described below with reference to the partial sections in FIGS. 1–4. It should however be noted that the invention is in no way limited to the following examples.

Example 1

A packaging material having oxygen barrier quality was prepared in accordance with the invention. The packaging material had the layer arrangement shown in FIG. 1 and it was prepared by the following procedure. Polypropylene containing no radical inhibitor was mixed with an oxidation catalyst cobalt (II) stearate to give a cobalt atomic concentration of 50 ppm, thereby yielding a polyolefinic resin layer 1 in a thickness of 40 μm. One side of this film was overlaid with a thin layer of inorganic substance 2 that was formed by plasma evaporation of silicon oxide in a thickness of 500 Å.

Example 2

Figure 1:
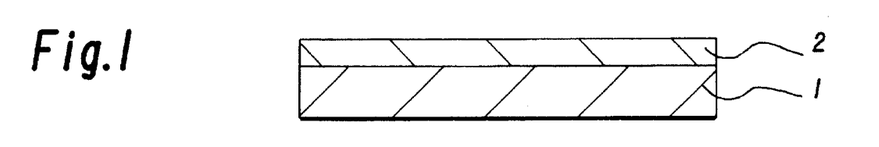
FIG. 1 is a partial section of a packaging material having oxygen barrier quality according to a first embodiment of the invention.

A packaging material having oxygen barrier quality was prepared by repeating the procedure of Example 1 except that the polyolefinic resin layer 1 was treated by corona discharge and overlaid with a thin layer of inorganic substance 2 that was formed by vacuum evaporation of aluminum in a thickness of 500 Å.

Comparative Example 1

The procedure of Example 1 was repeated, except that the film was solely comprised of polyolefinic resin layer 1 without the thin layer of inorganic substance 2.

Comparative Example 2

The procedure of Example 1 was repeated, except that the polyolefinic resin layer 1 was replaced by a polypropylene resin layer 40 μm thick to which no oxidation catalyst was added.

The samples of Examples 1 and 2, as well as Comparative Examples 1 and 2 were subjected to the measurement of oxygen permeability over time at 25° C. and at 95% r.h. The results are shown in Table 1. The measurement was conducted with Mocon Ox-TRAN 10/50A (product of Modern Control Co.).

TABLE 1

| Run No. | Oxygen permeability (cc/m$^2$ · day · atm) Days past | | | |
|---|---|---|---|---|
| | 1 | 7 | 28 | 100 |
| Example 1 | 1.53 | 0.23 | 0.06 | 0.01 |
| Example 2 | 0.98 | 0.52 | 0.01 | 0.02 |
| Comparative Example 1 | 4000 | 3000 | 1200 | 0.20 |
| Comparative Example 2 | 2.01 | 2.00 | 1.89 | 2.03 |

(Stored at 25° C.)

As one can see from Table 1, the packaging materials having oxygen barrier quality that were prepared in Examples 1 and 2 had excellent oxygen barrier quality.

Example 3

Packaging materials having oxygen barrier quality were prepared in accordance with the invention by repeating the procedure of Example 1, except that the coable stearate as an oxidation catalyst was replaced by aluminum stearate, zinc stearate, magnesium stearate, cobalt linoleate and cobalt naphthenate in the amounts shown in Table 2. The samples were evaluated by the same method as in Example 1 and the results are shown in Table 2.

TABLE 2

| Type/ concentration | Oxidation catalyst* Oxygen permeability (cc/m$^2$ · day · atm) | | | |
|---|---|---|---|---|
| | 1 day | 7 days | 28 days | 100 days |
| A/1000 ppm | 1.55 | 0.92 | 0.04 | 0.09 |
| B/2000 ppm | 1.02 | 1.03 | 0.29 | 0.11 |
| C/500 ppm | 1.29 | 0.62 | 0.52 | 0.13 |
| D/200 ppm | 1.88 | 0.62 | 0.17 | 0.03 |
| E/50 ppm | 0.86 | 0.44 | 0.08 | 0.01 |

(Stored at 25° C.)
*A: aluminum stearate
B: zinc stearate
C: magnesium stearate
D: cobalt linoleate
E: cobalt naphthenate As one can see from Table 2, good oxygen barrier quality could also be achieved even when other oxidation catalysts than coable stearate were used.

Example 4

Figure 2:
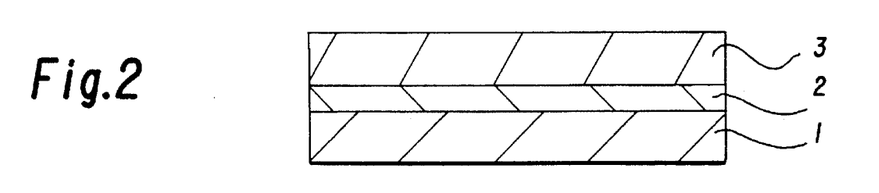
FIG. 2 is a partial section of a packaging material having oxygen barrier quality according to a second embodiment of the invention.

With a view to protecting it against deterioration by external and physical factors, the thin layer of inorganic substance 2 formed in Example 1 was dry laminated with a protective layer 3 as shown in FIG. 2 that was made of a biaxially oriented polyester film 12 μm thick. Thus, a packaging material having oxygen barrier quality was prepared in accordance with the invention.

Example 5

The procedure of Example 4 was repeated, except that the protective layer 3 was made of an unoriented polyethylene film 30 μm thick. By using the unoriented thermoplastic resin film, both the polyolefinic resin layer 1 and the protective layer 3 could be rendered to have a heat bonding property.

Example 6

Figure 3:
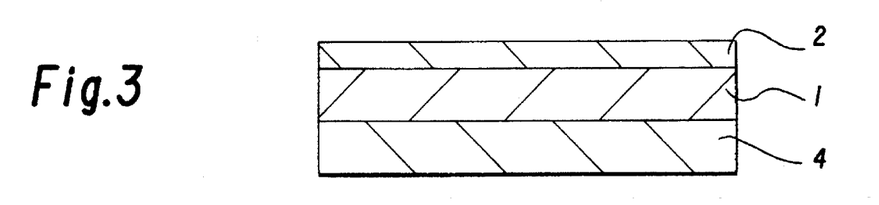
FIG. 3 is a partial section of a packaging material having oxygen barrier quality according to a third embodiment of the invention.

With a view to reinforcing the whole structure of the packaging material, a support layer 4 was provided as shown in FIG. 3. In Example 6, the support layer 4 was formed by co-extrusion of a polypropylene resin layer 40 μm thick together with a polyolefinic resin layer 1 formed in a thickness of 40 μm. The laminated film was further overlaid with a thin layer of inorganic substance 2 that was formed of silicon oxide in a thickness of 500 Å by plasma evaporation. Thus, a packaging material having oxygen barrier quality was prepared in accordance with the invention.

Example 7

A packaging material having oxygen barrier quality was prepared in accordance with the invention to attain the same purpose as in Example 6 by repeating the procedure of Example 1, except that the polyolefinic resin layer 1 containing the oxydation catalyst was dry laminated with a support layer 4 that was made from a film 40 μm thick of an ethylene-vinyl acetate copolymer resin having a good low-temperature fusing property.

Example 8

Figure 4:
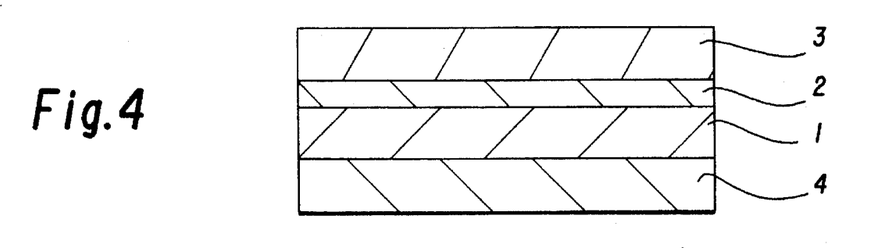
FIG. 4 is a partial section of a packaging material having oxygen barrier quality according to a fourth embodiment of the invention.

A packaging material having oxygen barrier quality was prepared by repeating the procedure of Example 1, except that the thin layer of inorganic substance 2 was dry laminated with a protective layer 3 made from a biaxially oriented polypropylene film 12 μm thick whereas the polyolefinic resin layer 1 was dry laminated with a support layer 4 made from an unoriented polypropylene film 30 μm thick, thereby producing the structure shown in FIG. 4. Since resin used in the packaging material of Example 8 was of a single kind (polypropylene), it could be melted for recycling. The proportion of the thin layer of inorganic substance 2 was too small to provide any obstacle to the recycling purpose.

Example 9

If, with the layer arrangement shown in FIG. 4, there is the possibility that the oxidation catalyst and any other additives contained in the polyolefinic resin layer 1 will enter the contents of package, the thin layer of inorganic substance 2 may be placed on the side facing the interior of the packaging material so that the entrance of those unwanted substances can be totally prevented. In this case, the protective layer 3 was formed of a heat sealing unoriented polyethylene film 40 μm thick and the support layer 4 was formed of a printed biaxially oriented polyester film 12 μm thick. These two layers were provided by dry lamination. Thus, a packaging material having oxygen barrier quality was prepared in accordance with the invention.

The samples of Examples 4–9 were evaluated for their oxygen permeability by the same method as in Example 1. Obviously, all samples exhibited high oxygen barrier quality, as can be seen from Table 3.

TABLE 3

| Run No. | Oxygen permeability (cc/m² · day · atm) Days past | | | |
|---|---|---|---|---|
| | 1 | 7 | 28 | 100 |
| Example 4 | 0.89 | 0.24 | 0.01 | 0.01 |
| Example 5 | 0.97 | 0.39 | 0.07 | 0.02 |
| Example 6 | 1.31 | 0.72 | 0.43 | 0.03 |
| Example 7 | 1.59 | 0.43 | 0.04 | 0.02 |
| Example 8 | 0.72 | 0.17 | 0.04 | 0.01 |
| Example 9 | 0.99 | 0.11 | 0.03 | 0.01 |

(Stored at 25° C.)

Example 10

A packaging material having oxygen barrier quality was prepared in accordance with the invention. The packaging material had the layer arrangement shown in FIG. 1 and it was prepared by the following procedure. EVOH (ethylene content: 32%) was mixed with an oxidation catalyst iron acetylacetonate (hereunder abbreviated as "acac.Fe") to an iron atomic concentration of 200 ppm, thereby yielding a resin composition layer having oxygen barrier quality 1 in a thickness of 20 μm. One side of this film was overlaid with a thin layer of inorganic substance 2 that was formed by plasma evaporation of silicon oxide in a thickness of 500 Å.

Example 11

A packaging material having oxygen barrier quality was prepared by repeating the procedure of Example 10 except that the resin composition layer having oxygen barrier quality 1 was treated corona discharge and overlaid with a thin layer of inorganic substance 2 that was formed by vacuum evaporation of aluminum in a thickness of 500 Å.

Comparative Example 3

The procedure of Example 10 was repeated, except that the film was solely comprised of the resin composition layer having oxygen barrier quality 1 without the thin layer of inorganic substance 2.

Comparative Example 4

The procedure of Example 10 was repeated, except that the resin composition layer having oxygen barrier quality 1 was replaced by an EVOH resin film 20 μm thick to which no oxidation catalyst was added.

The samples of Examples 10 and 11, as well as Comparative Examples 3 and 4 were subjected to the measurement of oxygen permeability over time at 25° C. and at 95% r.h. using the same apparatus as in Example 1. The results are shown in Table 4.

TABLE 4

| Run No. | Oxygen permeability (cc/m² · day · atm) Days past | | | |
|---|---|---|---|---|
| | 1 | 7 | 28 | 100 |
| Example 10 | 2.20 | 2.01 | 0.69 | 0.05 |
| Example 11 | 1.68 | 1.95 | 0.87 | 0.03 |
| Comparative Example 3 | 25.3 | 24.8 | 17.6 | 8.09 |
| Comparative Example 4 | 2.81 | 2.59 | 2.89 | 2.33 |

As one can see from Table 4, the packaging materials having oxygen barrier quality that were prepared in Examples 10 and 11 had excellent oxygen barrier quality.

Example 12

Packaging materials having oxygen barrier quality were prepared in accordance with the invention by repeating the procedure of Example 10, except that acac. Fe as the oxidation catalyst was replaced by aluminum stearate, zinc stearate, magnesium stearate, cobalt linoleate and cobalt naphthenate in the amounts shown in Table 5. The samples were evaluated by the same method as in Example 1 and the results are shown in Table 5.

TABLE 5

| Oxidation catalyst* Type/concentration | Oxygen permeability (cc/m² · day · atm) | | | |
|---|---|---|---|---|
| | 1 day | 7 days | 28 days | 100 days |
| A/2000 ppm | 2.59 | 2.56 | 2.06 | 0.40 |
| B/2000 ppm | 2.54 | 2.44 | 1.96 | 0.62 |
| C/1000 ppm | 2.81 | 2.44 | 1.98 | 0.14 |
| D/500 ppm | 2.01 | 1.89 | 0.89 | 0.06 |
| E/200 ppm | 1.77 | 1.59 | 0.66 | 0.03 |

(Stored at 25° C.)
*A: aluminum stearate
B: zinc stearate
C: magnesium stearate
D: cobalt linoleate
E: cobalt naphthenate As one can see from Table 5, good oxygen barrier quality could also be achieved even when other oxidation catalysts than acac. Fe were used.

Example 13

With a view to protecting it against deterioration by external and physical factors, the thin layer of inorganic substance 2 was dry laminated with a protective layer 3 as shown in FIG. 2 that was made of a biaxially oriented polyester film 12 μm thick. Thus, a packaging material having oxygen barrier quality was prepared in accordance with the invention.

Example 14

The procedure of Example 13 was repeated, except that the protective layer 3 was made of an unoriented polyethylene film 30 μm thick. By using the unoriented thermoplastic resin film, the protective layer 3 could be rendered to have a heat sealing property.

Example 15

With a view to reinforcing the whole structure of the packaging material, a support layer 4 was provided as shown in FIG. 3. In Example 15, the support layer 4 was formed by co-extrusion of a polypropylene resin layer 40 μm thick together with a resin composition layer having oxygen barrier quality 1 formed in a thickness of 20 μm. The laminated film was further overlaid with a thin layer of inorganic substance 2 that was formed of silicon oxide in a thickness of 500 Å by plasma evaporation. Thus, a packaging material having oxygen barrier quality was prepared in accordance with the invention.

Example 16

A packaging material having oxygen barrier quality was prepared in accordance with the invention to attain the same purpose as in Example 15 by repeating the procedure of Example 10, except that the resin composition layer having oxygen barrier quality 1 was dry laminated with a support layer 4 that was made from a film 40 μm of an ethylene-vinyl acetate copolymer resin having a good low-temperature fusing property.

Example 17

A packaging material having oxygen barrier quality was prepared by repeating the procedure of Example 10, except that the thin layer of inorganic substance 2 was dry laminated with a protective layer 3 made from a biaxially oriented polypropylene film 12 μm thick whereas the resin composition layer having oxygen barrier quality 1 was dry laminated with a support layer 4 made from an unoriented polypropylene film 30 μm thick, thereby yielding the structure shown in FIG. 4.

Example 18

If, with the layer arrangement shown in FIG. 4, there is the possibility that the oxidation catalyst and any other additives contained in the resin composition layer having oxygen barrier quality 1 will enter the contents of package, the thin layer of inorganic substance 2 may be placed on the side facing the interior of the packaging material so that the entrance of those unwanted substances can be totally prevented. In this case, the protective layer 3 was formed of a heat sealing unoriented polyethylene film 40 μm thick and the support layer 4 was formed of a printed biaxially oriented polyester film 12 μm thick. These two layers were provided by dry lamination. Thus, a packaging material having oxygen barrier quality was prepared in accordance with the invention.

The samples of Examples 13–18 were evaluated for their oxygen permeability by the same method as in Example 1. Obviously, all samples exhibited high oxygen barrier quality, as can be seen from Table 6.

TABLE 6

| Run No. | Oxygen permeability (cc/m$^2$ · day · atm) Days past | | | |
|---|---|---|---|---|
| | 1 | 7 | 28 | 100 |
| Example 13 | 1.92 | 1.84 | 0.92 | 0.04 |
| Example 14 | 2.00 | 1.77 | 0.69 | 0.04 |
| Example 15 | 2.61 | 2.32 | 0.99 | 0.05 |
| Example 16 | 2.44 | 1.98 | 0.83 | 0.02 |
| Example 17 | 1.09 | 1.09 | 0.55 | 0.03 |
| Example 18 | 1.53 | 1.39 | 0.67 | 0.02 |

(Stored at 25° C.)

Example 19

Packaging materials having oxygen barrier quality were prepared in accordance with the invention. The packaging materials had the layer arrangement shown in FIG. 1 and they were prepared by the following procedure. EVOH and polypropylene that contained no radical inhibitor were simultaneously mixed with an oxidation catalyst cobalt (II) stearate to a cobalt atomic concentration of 200 ppm, thereby yielding resin composition layers having oxygen barrier quality 1 in a thickness of 40 μm. These films were overlaid on one side with a thin layer of inorganic substance 2 that was formed by plasma evaporation of silicon oxide in a thickness of 500 Å. The mixing ratio of EVOH and polypropylene was varied from 5:95 to 95:5 by wt % as shown in Table 7. In Example 19, the two kinds of thermoplastic resin were simultaneously mixed with the oxidation catalyst and the mixtures were processed into films of resin composition having oxygen barrier quality and this processing method is designated as A in Table 7.

Example 20

A resin composition layer having oxygen barrier quality 1 was prepared by the following procedure: polypropylene was mixed with an oxidation catalyst cobalt (II) stearate to give a cobalt atomic concentration of 200 ppm; the mixture was extrusion molded with a twin-screw extruder at an extrusion temperature of 220° C. to form resin pellets; the pellets were then mixed with EVOH and the mixture was processed into a film. This processing method is designated as B in Table 7. As in Example 19, one side of this film was overlaid with a thin layer of inorganic substance 2 that was formed by plasma evaporation of silicon oxide in a thickness of 500 Å. Several packaging materials having oxygen barrier quality were produced by this method, with the mixing ratio of EVOH to the oxidation catalyst containing polypropylene being varied from 5:95 to 95:5 by wt % as shown in Table 7.

Comparative Example 5

The procedure of Example 19 was repeated, except that the film was solely comprised of the resin composition layer having oxygen barrier quality 1 without the thin layer of inorganic substance 2. The mixing ratio of EVOH to polypropylene was 20:80 by weight percent.

The samples of Examples 19 and 20, as well as Comparative Example 5 were subjected to the measurement of oxygen permeability at 25° C. and at 95% r.h. as in Example 1. The results are shown in Table 7.

TABLE 7

| Run No. | Processing method | EVOH/PP (wt %) | Oxygen permeability (cc/m² · day · atm) | | |
|---|---|---|---|---|---|
| | | | 1 day | 30 days | 100 days |
| Example 19 | A | 5/95 | 2.05 | 0.81 | 0.04 |
| | | 10/90 | 2.07 | 0.79 | 0.02 |
| | | 20/80 | 2.10 | 0.86 | 0.03 |
| | | 50/50 | 1.52 | 0.94 | 0.06 |
| | | 80/20 | 1.78 | 0.86 | 0.14 |
| | | 90/10 | 1.53 | 1.32 | 0.09 |
| | | 95/5 | 2.22 | 2.01 | 0.16 |
| Example 20 | B | 5/95 | 1.94 | 0.62 | 0.03 |
| | | 10/90 | 2.00 | 0.61 | 0.06 |
| | | 20/80 | 1.76 | 0.74 | 0.11 |
| | | 50/50 | 1.98 | 1.01 | 0.09 |
| | | 80/20 | 1.70 | 1.32 | 0.17 |
| | | 90/10 | 2.43 | 1.43 | 0.22 |
| | | 95/5 | 1.43 | 1.32 | 0.21 |
| Comparative Example 5 | A | 20/80 | 1100 | 80 | 12 |

*PP: polypropylene

As can be seen from Table 7, the packaging materials prepared in Examples 19 and 20 according to the invention had excellent oxygen barrier quality.

Example 21

Packaging materials having oxygen barrier quality were prepared by repeating the procedure of Example 19, except that polyester and EVOH were blended as thermoplastic resins in the proportions shown in Table 8 so as to form the layer of resin composition having oxygen barrier quality 1.

Example 22

Packaging materials having oxygen barrier quality were prepared by repeating the procedure of Example 19, except that polyester and polypropylene were blended as thermoplastic resins in the proportions shown in Table 8 so as to form the layer of resin composition having oxygen barrier quality 1.

Example 23

Packaging materials having oxygen barrier quality were prepared by repeating the procedure of Example 19, except that polyethylene and polypropylene were blended as thermoplastic resins in the proportions shown in Table 8 so as to form the layer of resin composition having oxygen barrier quality 1.

Example 24

Packaging materials having oxygen barrier quality were prepared by repeating the procedure of Example 19, except that polyurethane and polypropylene were blended as thermoplastic resins in the proportions shown in Table 8 so as to form the layer of resin composition having oxygen barrier quality 1.

Example 25

Packaging materials having oxygen barrier quality were prepared by repeating the procedure of Example 19, except that an ethylene-methacrylic acid copolymer and polyethylene were blended as thermoplastic resins in the proportions shown in Table 8 so as to form the layer of resin composition having oxygen barrier quality 1.

Example 26

Packaging materials having oxygen barrier quality were prepared by repeating the procedure of Example 20, except that EVOH as a thermoplastic resin preloaded with the oxidation catalyst was blended with polyester as the other thermoplastic resin in the proportions shown in Table 8 so as to form the layer of resin composition having oxygen barrier quality 1.

Example 27

Packaging materials having oxygen barrier quality were prepared by repeating the procedure of Example 20, except that polypropylene as a thermoplastic resin preloaded with the oxidation catalyst was blended with polyester as the other thermoplastic resin in the proportions shown in Table 8 so as to form the layer of resin composition having oxygen barrier quality 1.

Example 28

Packaging materials having oxygen barrier quality were prepared by repeating the procedure of Example 20, except that polypropylene as a thermoplastic resin preloaded with the oxidation catalyst was blended with polyethylene as the other thermoplastic resin in the proportions shown in Table 8 so as to form the layer of resin composition having oxygen barrier quality 1.

Example 29

Packaging materials having oxygen barrier quality were prepared by repeating the procedure of Example 20, except that polypropylene as a thermoplastic resin preloaded with the oxidation catalyst was blended with polyurethane as the other thermoplastic resin in the proportions shown in Table 8 so as to form the layer of resin composition having oxygen barrier quality 1.

Example 30

Packaging materials having oxygen barrier quality were prepared by repeating the procedure of Example 20, except that polyethylene as a thermoplastic resin preloaded with the oxidation catalyst was blended with an ethylene-methacrylic acid copolymer as the other thermoplastic resin in the proportions shown in Table 8 so as to form the layer of resin composition having oxygen barrier quality 1.

Comparative Example 6

The procedure of Example 26 was repeated, except that the film was solely comprised of the resin composition layer having oxygen barrier quality 1 without the thin layer of inorganic substance 2. The mixing ratio of EVOH to polyester was 20:80 by weight percent.

Comparative Example 7

The procedure of Example 27 was repeated, except that the film was solely comprised of the resin composition layer having oxygen barrier quality 1 without the thin layer of inorganic substance 2. The mixing ratio of polypropylene to polyester was 20:80 by weight percent.

Comparative Example 8

The procedure of Example 28 was repeated, except that the film was solely comprised of the resin composition layer having oxygen barrier quality 1 without the thin layer of inorganic substance 2. The mixing ratio of polypropylene to polyethylene was 20:80 by weight percent.

Comparative Example 9

The procedure of Example 29 was repeated, except that the film was solely comprised of the resin composition layer having oxygen barrier quality 1 without the thin layer of inorganic substance 2. The mixing ratio of polypropylene to polyurethane was 20:80 by weight percent.

Comparative Example 10

The procedure of Example 30 was repeated, except that the film was solely comprised of the resin composition layer having oxygen barrier quality 1 without the thin layer of inorganic substance 2. The mixing ratio of ratio of polyethylene to ethylene-methacrylic acid copolymer was 20:80 by weight percent.

The samples of Examples 21–30 as well as Comparative Examples 6–10 were evaluated by the same method as in Example 1. The results are shown in Table 8 below.

TABLE 8

| Run No. | Processing method | Mixing ratio of thermoplastic resins (wt %) | Oxygen permeability (cc/m² · day · atm) | | |
|---|---|---|---|---|---|
| | | | 1 day | 30 days | 100 days |
| Ex. 21 | A | PET/EVOH = 90/10 | 1.52 | 0.40 | 0.04 |
| | | PET/EVOH = 80/20 | 1.41 | 0.22 | 0.03 |
| | | PET/EVOH = 60/40 | 1.44 | 0.43 | 0.01 |
| Ex. 22 | A | PET/PP = 90/10 | 1.63 | 1.23 | 0.51 |
| | | PET/PP = 80/20 | 1.63 | 1.15 | 0.54 |
| | | PET/PP = 60/40 | 2.12 | 1.08 | 0.32 |
| Ex. 23 | A | PE/PP = 90/10 | 2.21 | 0.79 | 0.02 |
| | | PE/PP = 80/20 | 1.77 | 0.76 | 0.02 |
| | | PE/PP = 60/40 | 2.02 | 0.99 | 0.03 |
| Ex. 24 | A | PU/PP = 90/10 | 2.21 | 1.89 | 0.37 |
| | | PU/PP = 80/20 | 2.18 | 1.88 | 0.29 |
| | | PU/PP = 60/40 | 2.00 | 1.76 | 0.08 |
| Ex. 25 | A | EMAA/PE = 90/10 | 1.92 | 1.62 | 0.41 |
| | | EMAA/PE = 80/20 | 1.93 | 1.55 | 0.16 |
| | | EMAA/PE = 60/40 | 1.91 | 1.36 | 0.16 |
| Ex. 26 | B | PET/EVOH = 90/10 | 1.36 | 0.40 | 0.01 |
| | | PET/EVOH = 80/20 | 1.59 | 0.49 | 0.02 |
| | | PET/EVOH = 60/40 | 1.50 | 0.33 | 0.02 |
| Ex. 27 | B | PET/PP = 90/10 | 1.73 | 1.19 | 0.14 |
| | | PET/PP = 80/20 | 1.64 | 1.16 | 0.39 |
| | | PET/PP = 60/40 | 1.58 | 0.82 | 0.20 |
| Ex. 28 | B | PE/PP = 90/10 | 1.72 | 0.93 | 0.04 |
| | | PE/PP = 80/20 | 1.59 | 0.88 | 0.04 |
| | | PE/PP = 60/40 | 2.03 | 0..87 | 0.02 |
| Ex. 29 | B | PU/PP = 90/10 | 2.30 | 1.82 | 0.31 |
| | | PU/PP = 80/20 | 2.09 | 1.66 | 0.31 |
| | | PU/PP = 60/40 | 1.98 | 1.02 | 0.22 |
| Ex. 30 | B | EMAA/PE = 90/10 | 1.33 | 1.42 | 0.33 |
| | | EMAA/PE = 80/20 | 2.20 | 1.44 | 0.31 |
| | | EMAA/PE = 60/40 | 1.77 | 1.31 | 0.20 |
| Com. Ex. 6 | B | PET/EVOH = 80/20 | 55 | 12 | 11 |
| 7 | B | PET/PP = 80/20 | 82 | 53 | 26 |
| 8 | B | PE/PP = 80/20 | 3500 | 420 | 32 |
| 9 | B | PU/PP = 80/20 | >4000 | 1000 | 200 |
| 10 | B | EMAA/PE = 80/20 | 1100 | 540 | 180 |

*PP: polypropylene; PET, polyester; PE, polyethylene; PU, polyurethane; EMAA, ethylene-methacrylic acid copolymer As can be seen from Table 8, the packaging materials prepared in Examples 21–30 in accordance with the invention exhibited high oxygen barrier effect from the initial stage (immediately after their preparation).

Example 31

Packaging materials having oxygen barrier quality were prepared in accordance with the invention by repeating the procedure of Example 26, except that the cobalt stearate as an oxidation catalyst was replaced by aluminum stearate, zinc stearate, magnesium stearate, cobalt linoleate and cobalt naphthenate in the amounts shown in Table 9. The mixing ratio of catalyst-loaded EVOH to polyester was 20:80 by weight percent. The samples were evaluated by the same method as in Example 1 and the results are shown in Table 9.

TABLE 9

| Type/ concentration | Oxidation catalyst* Oxygen permeability (cc/m² · day · atm) | | |
|---|---|---|---|
| | 1 day | 30 days | 100 days |
| A/1000 ppm | 1.86 | 1.02 | 0.07 |
| B/2000 ppm | 1.86 | 1.32 | 0.08 |
| C/1000 ppm | 1.72 | 1.04 | 0.10 |
| D/200 ppm | 1.44 | 0.64 | 0.02 |
| E/200 ppm | 1.42 | 0.52 | 0.04 |
| Comp. Example 6 | 55 | 12 | 11 |

*A: aluminum stearate
B: zinc stearate
C: magnesium stearate
D: cobalt linoleate
E: cobalt naphthenate As one can see from Table 9, high oxygen barrier effect could also be achieved even when other oxidation catalysts than cobalt stearate were used.

Example 32

Packaging materials having oxygen barrier quality were prepared by repeating the procedure of Example 26 except that the layer of resin composition having oxygen barrier quality 1 was treated by corona discharge and overlaid with a thin layer of inorganic Substance 2 that was formed by vacuum evaporation of aluminum in a thickness of 500 Å. The samples were evaluated by the same method as in Example 1 and the results are shown in Table 10 below.

TABLE 10

| Run No. | Mixing ratio of thermoplastic resins (wt %) | Oxygen permeability (cc/m² · day · atm) | | |
| --- | --- | --- | --- | --- |
| | | 1 day | 30 days | 100 days |
| Example 32 | PET/EVOH = 90/10 | 2.43 | 0.82 | 0.04 |
| | PET/EVOH = 80/20 | 2.22 | 0.66 | 0.04 |
| | PET/EVOH = 60/40 | 2.36 | 0.62 | 0.04 |
| Comp. Example 6 | PET/EVOH = 80/20 | 55 | 12 | 11 |

As is clear from Table 10, the packaging materials prepared in Example 32 in accordance with the invention exhibited high oxygen barrier effect from the initial state (immediately after their preparation).

Example 33

With a view to protecting it against deterioration by external and physical factors, the thin layer of inorganic substance 2 was dry laminated with a protective layer 3 as shown in FIG. 2 that was made of a biaxially oriented polyester film 12 µm thick. Thus, a packaging material having oxygen barrier quality was prepared in accordance with the invention. The mixing ratio of the thermoplastic resin containing the oxidation catalyst to the catalyst free thermoplastic resin was 20:80 by weight percent.

Example 34

With a view to reinforcing the whole structure of the packaging material, the protective layer 3 in Example 33 was replaced by a support layer 4 which was provided as shown in FIG. 3. In Example 34, the support layer 4 was formed by co-extrusion of a polypropylene resin layer 40 µm thick together with a resin composition layer having oxygen barrier quality 1 formed in a thickness of 40 µm, with an adhesive layer interposed. The laminated film was further overlaid with a thin layer of inorganic substance 2 that was formed of silicon oxide in a thickness of 500 Å by plasma evaporation. Thus, a packaging material having oxygen barrier quality was prepared in accordance with the invention.

Example 35

A packaging material having oxygen barrier quality was prepared in accordance with the invention to attain the same purpose as in Example 34 by repeating the procedure of Example 33, except that the resin composition layer having oxygen barrier quality 1 which contained the oxidation catalyst was dry laminated with a support layer 4 that was made from a film 40 µm thick of an ethylene-vinyl acetate copolymer resin having a good low-temperature fusing property, with a polyurethane-base adhesive being provided between the two layers.

Example 36

A packaging material having oxygen barrier quality was prepared by repeating the procedure of Example 33, except that the resin composition layer having oxygen barrier quality 1 was dry laminated with a support layer 4 made from an unoriented polypropylene film 30 µm thick, thereby producing the structure shown in FIG. 4.

Example 37

If there is the possibility in Example 36 that the oxidation catalyst and any other additives contained in the resin composition layer 1 having oxygen barrier quality 1 will enter the contents of package, the thin layer of inorganic substance 2 may be placed on the side facing the interior of the packaging material so that the entrance of those unwanted substances can be totally prevented. In this case, the protective layer 3 was formed of a heat sealing unoriented polyethylene film 40 µm thick and the support layer 4 was formed of printed biaxially oriented polyester film 12 µm thick. These two layers were provided by dry lamination. Thus, a packaging material having oxygen barrier quality was prepared in accordance with the invention.

The samples of Examples 33–37 were evaluated for their oxygen permeability by the same method as in Example 1. The results are shown in Table 11 below together with the data for Comparative Examples 6 and 8. Obviously, all of the samples prepared in accordance with the invention exhibited high oxygen barrier quality.

TABLE 11

| Run No. | Mixing ratio of thermoplastic resins (wt %) | Oxygen permeability (cc/m² · day · atm) | | |
| --- | --- | --- | --- | --- |
| | | 1 day | 30 days | 100 days |
| Example 33 | PET/EVOH = 80/20 | 1.51 | 0.50 | 0.02 |
| | PE/PP = 80/20 | 1.52 | 0.73 | 0.03 |
| Example 34 | PET/EVOH = 80/20 | 1.53 | 0.49 | 0.02 |
| | PE/PP = 80/20 | 1.83 | 0.83 | 0.01 |
| Example 35 | PET/EVOH = 80/20 | 2.02 | 0.38 | 0.05 |
| | PE/PP = 80/20 | 1.82 | 0.92 | 0.03 |
| Example 36 | PET/EVOH = 80/20 | 1.50 | 0.29 | 0.01 |
| | PE/PP = 80/20 | 1.51 | 0.65 | 0.01 |
| Example 37 | PET/EVOH = 80/20 | 1.52 | 0.32 | 0.02 |
| | PE/PP = 80/20 | 1.39 | 0.71 | 0.01 |
| Comp. Example 6 | PET/EVOH = 80/20 | 55 | 12 | 11 |
| Comp. Example 8 | PE/PP = 80/20 | 3500 | 420 | 32 |

In accordance with the present invention, packaging materials capable of exhibiting high oxygen barrier quality in a consistent manner can be produced by providing a thin layer of inorganic substance over a layer of resin composition having oxygen barrier quality that contains an oxidation catalyst. If laminated with dissimilar thermoplastic resins, the packaging materials can be furnished with various practically advantageous functions without compromising the high oxygen barrier quality.

What is claimed is:

1. A packaging material having oxygen barrier quality comprising a layer of inorganic substance selected from Al, Mg, Ca, Sn, Ti, Zn, Zr, oxides of said metals or oxides of non-metallic inorganic substances formed on a layer of a resin composition having oxygen barrier quality that comprises at least one thermoplastic resin selected from a polyolefin and a saponification product of an ethylene-vinyl acetate copolymer or a blend of two or more thereof and 50–500 ppm of an oxidation catalyst.

2. A packaging material having oxygen barrier quality according to claim 1 wherein said polyolefin is high-density polyethylene, low-density polyethylene, linear low-density polyethylene, polypropylene, polybutene or polymethylpentene, or a copolymer of two or more monomers selected from among ethylene, propylene, butene and methylpentene.

3. A packaging material having oxygen barrier quality according to claim 1 wherein said blend of thermoplastic resins is a blend of two or more polymers selected from the group consisting of high-density polyethylene, low-density polyethylene, linear low-density polyethylene, polypropylene, polybutene, polymethylpentene, the saponification product of an ethylene-vinyl acetate copolymer, polyvinylidene chloride, polyvinyl chloride, polyesters, polycarbonates, polymethyl methacrylates, polyacrylonitrile, polystyrenes, polyurethanes, polyamides, polyvinyl acetate, polyvinyl alcohol, polyoxymethylene, and copolymers of two or more monomer components in the polymers listed above, as well as modified resins of said copolymers.

4. A packaging material having oxygen barrier quality according to claims 1 or 2 wherein said layer of inorganic substance has a thickness of 200–2,000 angstrom.

5. A packaging material having oxygen barrier quality according to claim 1 wherein said oxidation catalyst is selected from among organic acid salts of Co, Mn, Fe, Cu, Ni, Ti, V, Cr, Al, Na and Zn.

* * * * *